(No Model.)　　　　W. E. HENDRICKS.　　　2 Sheets—Sheet 1.
PLOW.
No. 419,946.　　　　　　　　　Patented Jan. 21, 1890.
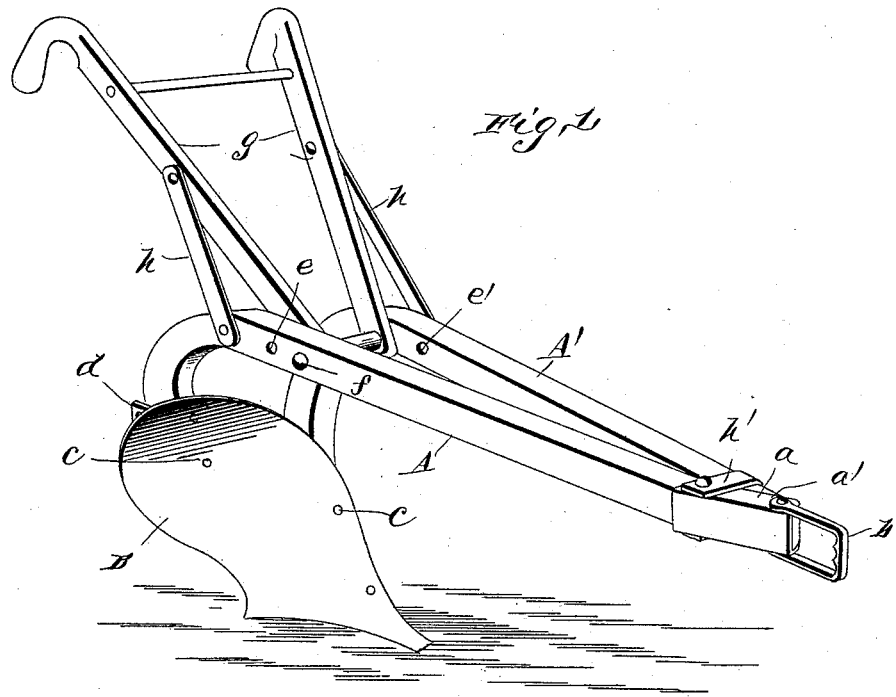
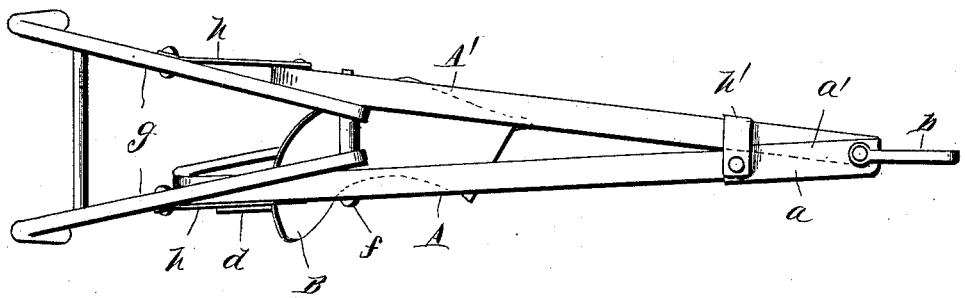
WITNESSES
C. L. Taylor,
Villette Anderson.
INVENTOR
W. E. Hendricks
by E. W. Anderson
his Attorney (No Model.) 2 Sheets—Sheet 2.
W. E. HENDRICKS.
PLOW.
No. 419,946. Patented Jan. 21, 1890.
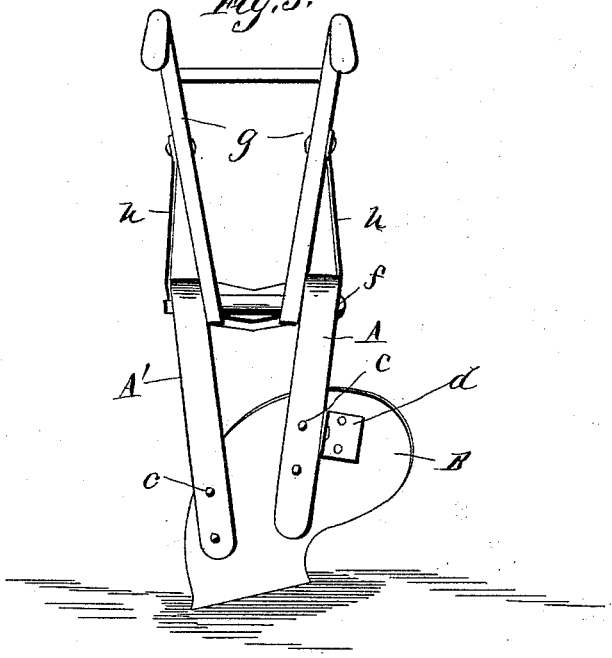
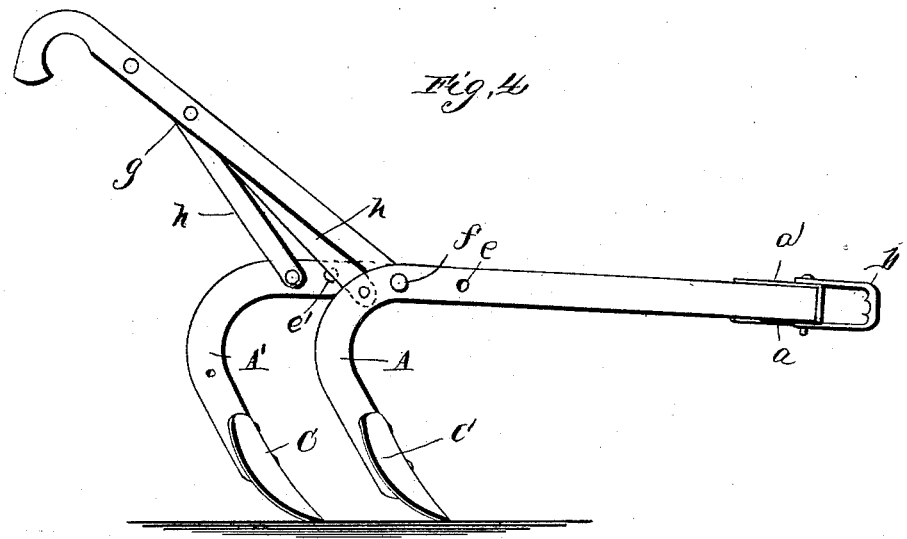
WITNESSES
C. L. Taylor,
Villette Anderson.
INVENTOR
W. E. Hendricks
by E. W. Anderson,
his Attorney

UNITED STATES PATENT OFFICE.

WILLIAM ELI HENDRICKS, OF HELTONVILLE, INDIANA.

PLOW.

SPECIFICATION forming part of Letters Patent No. 419,946, dated January 21, 1890.

Application filed June 29, 1889. Serial No. 316,053. (No model.)

*To all whom it may concern:*

Be it known that I, WILLIAM ELI HENDRICKS, a citizen of the United States, and a resident of Heltonville, in the county of Lawrence and State of Indiana, have invented certain new and useful Improvements in Plows; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a perspective view of the mold-board plow. Fig. 2 is a top view of same. Fig. 3 is a rear view of mold-board plow, and Fig. 4 is a side view showing cultivators attached.

This invention relates to certain improvements in plows convertible from mold-board or turning plows into double or single shovel plows; and it consists of the novel combination of parts and their construction, as will fully appear from the following description and accompanying illustration.

In the embodiment of my invention I employ two beams A A', the inner or rear lower ends of which converge or approach each other. The forward ends of the beams A A' also converge and are connected together by a coupling $a$, the end of one beam, however, standing a short distance in advance of the other. The coupling $a$ consists of a keeper-plate rectangular in cross-section and having upper and lower parallel wings $a'$, which receives and is connected to the forward end of one beam A at its rear end next its outside wall by a pivot-bolt, and receives through its inner open side that portion of the beam A' standing or projecting beyond the beam A. The forward end of the coupling $a$ is connected to the forward end of the beam A' also by a pivot-bolt, and connecting therewith by the same means is the hitching-clevis $b$. By means of this form of coupling the beams A A' are relatively movable or adjustable in the direction of their lengths when the mold-board plow (presently more fully referred to) is removed to permit the pendent portion or shank of one beam to be arranged a short distance in advance of the shank or pendent portion of the other beam. It is obvious that by means of this arrangement, when the mold-board plow is removed, as aforesaid, a shovel or cultivator plow can be applied to each beam, and thus effect the conversion of the implement from a single mold-board or turning plow into a double shovel or cultivator plow; also, by dispensing with one beam a single shovel or cultivator plow can be provided, if desired.

B is the mold-board or turning plow having its landside made of light plow-steel.

The plow B is connected to the lower ends or shanks of the beams A A', so as to be readily removable or detachable for the purpose aforesaid, by means of bolts $c$, a stepped brace $d$ being applied, as shown, to prevent said shanks or beams from springing apart, said brace being bolted to the landside and to one of said shanks just in rear of the mold-board.

In the beams A A' are series of apertures $e\ e'$, one series being provided in each beam, and through these apertures is inserted a holding and adjusting bolt $f$. In the present instance the bolt $f$ is shown passed through the forward one of one series of said apertures $e$ and through the rear aperture of the other series, as is the case when the turning or mold-board plow is in use.

When the shovel or cultivator plows C C are applied to the lower ends of the plow-beams, the mold-board plow being removed, the beams A A' are relatively adjusted to align the rear aperture $e$ with the forward aperture $e'$, whereby the shanks of said beams are adjusted to receive the said cultivator or plow shovels.

The upper connection between the plow or cultivator shovels and the beams A A' is effected by means of wooden pins, so that when the shovels or plows are subjected to a certain strain by contact with an obstruction they will swing rearward upon their lower pin or bolt as a pivot, and thus prevent straining the draft-clevis and the coupling at the forward end of the beams. The cultivator-shovels are constructed, preferably, with sockets to receive the beams A A when they are connected thereto.

Suitable guiding or manipulating handles $g\ g$ are applied at their lower ends to the beam-holding bolt $f$, and are suitably braced in position by means of metallic plate-like bars or straps $h$, connected to the beams and the handles.

As previously intimated, this implement can be employed for heavy work, to perform which the turning or mold-board plow is used, and also for light or garden work, or wherever cultivation of plants, &c., is required, when the plow or cultivator shovels are brought into requisition.

A bail or clip $h'$ may be applied in connection with the coupling at the forward ends of the beams, as shown, to aid the securing together of the beams.

Having fully described my invention, what I claim, and desire to secure by Letters Patent, is—

The plow having the relatively adjustable beams coupled together at their forward ends, one in advance of the other, in combination with the rectangular winged keeper-plate coupling open at the inside and having pivot-bolt connection with said beams, said beams also having series of adjusting-apertures, one arranged in advance of the other, and a connecting-bolt engaging coincident apertures of said series, substantially as set forth.

In testimony whereof I affix my signature in presence of two witnesses.

WILLIAM ELI HENDRICKS.

Witnesses:
OLIVER P. HUNTER,
MAGGIE A. HUNTER.